US008657932B2

(12) United States Patent
Huziwara et al.

(10) Patent No.: US 8,657,932 B2
(45) Date of Patent: Feb. 25, 2014

(54) CYCLONE SEPARATOR AND SEPARATION METHOD

(75) Inventors: Wilson Kenzo Huziwara, Rio de Janeiro (BR); Celson Murilo Dos Santos, São Mateus do Sul (BR); Rogério Michelan, São Mateus do Sul (BR); Emanuel Freire Sandes, Niterói (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 185 days.

(21) Appl. No.: 13/002,000

(22) PCT Filed: Jun. 25, 2009

(86) PCT No.: PCT/GB2009/001600
§ 371 (c)(1), (2), (4) Date: Apr. 26, 2011

(87) PCT Pub. No.: WO2010/001097
PCT Pub. Date: Jan. 7, 2010

(65) Prior Publication Data

US 2011/0226129 A1 Sep. 22, 2011

(30) Foreign Application Priority Data

Jun. 30, 2008 (BR) ...................................... 0803051

(51) Int. Cl.
*B01D 45/12* (2006.01)

(52) U.S. Cl.
USPC .................. 95/271; 96/195; 55/460; 55/447; 55/459.1; 55/419

(58) Field of Classification Search
USPC .................. 55/460, 447, 459.1, 419; 95/271; 96/195; 406/173; 210/512.1; 209/139.2
See application file for complete search history.

(56) References Cited

U.S. PATENT DOCUMENTS

| | | | |
|---|---|---|---|
| 2,816,490 | A | 12/1957 | Boadway et al. |
| 3,720,314 | A | 3/1973 | Phillippi |
| 4,820,414 | A | 4/1989 | Carroll et al. |
| 4,927,298 | A | 5/1990 | Tuszko et al. |

FOREIGN PATENT DOCUMENTS

| | | | |
|---|---|---|---|
| FR | 2021978 | A | 7/1970 |
| FR | 2033507 | A | 12/1970 |

*Primary Examiner* — Dung H Bui
(74) *Attorney, Agent, or Firm* — Sughrue Mion, PLLC

(57) ABSTRACT

A separator comprises a separation chamber (1) with at least one inlet (11*a*) in its upper part, a solids outlet (12) in its lower part and two outlet pipes (2 and 3) for fractions of gas. Also described is a method which the separator uses, with the fractions of gas being sucked out in two separation zones generated inside the chamber, one with reverse flow and the other with unidirectional flow.

18 Claims, 3 Drawing Sheets

CYCLONE SEPARATOR AND SEPARATION METHOD

CROSS REFERENCE TO RELATED APPLICATIONS

This application is a National Stage of International Application No. PCT/GB2009/001600 filed Jun. 25, 2009, which claims priority from Brazilian Patent Application No. PI 0803051-0 filed Jun. 30, 2008, the contents of all of which are incorporated herein by reference in their entirety.

FIELD OF THE INVENTION

This invention is concerned with equipment and methods for separating solid particles from gas-solid suspensions, in particular cyclone separators in which a tangential force component is imparted to the gas-solid suspension.

BACKGROUND OF THE INVENTION

Cyclone separators in various different constructional forms are used in a number of devices and/or equipment for separating impurities contained in gaseous fluids, such as solid particles or dust, droplets of liquids or similar material.

Cyclone separators are widely used for separating and/or removing particles from the air or from process gases. They are also used as chemical reactors, heat exchangers and for drying granular materials and combustion of oil. In petroleum refineries, they are used for ensuring the continuity of the process for obtaining products, retaining a catalyst and impeding its emission into the atmosphere, preventing loss and pollution. The great applicability of cyclone separators is due to their low operating cost, easy maintenance and the possibility of withstanding severe temperature and pressure conditions.

Cyclone separators can be used in various different arrangements, in series or in parallel. In some processes, all of the gaseous fluid produced, which shall hereinafter be called gas-solid suspension, passes through the separator. In other processes, cyclone separators can be used as part of the waste gas cleaning system.

The particles are separated by a process of centrifugation of the gas-solid suspension. This phenomenon occurs with the induction of a vortical flow inside the cyclone separator due to the significant tangential force component with which the suspension enters the cyclone chamber, which is generally of a conical shape. Being of greater density than the gases, the solid particles have a greater tendency to remain in the trajectory perpendicular to the vortical flow, due to centrifugal force and thus to collide with the walls of the chamber. With the collisions, the particles lose speed and tend to separate from the flow, falling towards the bottom of the chamber, from where they are removed. The gas separated goes out through the outlet pipe of the cyclone, after moving in several revolutions through the chamber and in a curve with an accentuated angle towards the pipe in the upper part.

Cyclone separators of gas-solid suspensions are generally of the reverse flow type, which are the most conventional ones for this type of separation. However, unidirectional flow cyclones are also used, principally in applications where the concentration of solids in the suspension is low.

In reverse flow cyclones, the gas outlet pipe, usually called the finder or vortex pipe, is fixed and located in the upper part of the cyclone. During operation, there is a need for the total reversal of the vortical flow of the gas so that it is sucked by the outlet pipe.

In unidirectional flow cyclones, also known by the English term "uniflow", the gas outlet pipe is located in the lower part of the cyclone, there consequently not being a need for reversal of the vortical flow.

In these two configurations, the cyclone separator comprises only one separation zone, the unidirectional flow separator having a separation zone length shorter than that of a separator with reverse flow, this being the reason why the unidirectional flow separator is efficient only in gas-solid suspensions with low concentrations of solids.

Although the separation zone of the reverse flow separator is larger, the flow reversal zone is the region in which the greatest loss of collection efficiency of the cyclone separator occurs.

The instability existing at the flow reversal apex results in lateral displacements of the vortical flow, causing entrainment of solids previously separated and erosion of the cyclone separator walls.

U.S. Pat. No. 4,238,210 discloses a unidirectional cyclone separator which comprises an internal duct, which forms a flow path, with a central body provided with vortical flow generating helixes extended externally. The duct is enclosed by a collecting chamber and the helixes have collecting ends and channels which open through the wall of the duct to the inside of the collecting chamber. Downstream from the vortical flow generating helixes, there are outlet slots which are transverse with respect to the gas flow.

As with the other unidirectional cyclone separators, this equipment is efficient only for suspensions with low concentrations of solids.

The device and method described below are an alternative which has advantages for the separation of gas-solid suspensions with respect to the devices and methods known in the prior art for low and high concentrations.

SUMMARY OF THE INVENTION

This invention relates to a cyclone separator for a gas-solid suspension and a separation method in which the separator comprises two separation zones, which may be in sequence, one with reverse flow, in which a portion of the gas of the gas-solid suspension, with a high concentration of solids, may be separated and one unidirectional flow separation zone (which may be subsequent to the reverse flow separation zone) in which the other portion of the gas of the suspension, with a low or lower concentration of solids, is separated.

According to an aspect of the invention, there is provided a cyclone separator for separating particles from a mixture of gas and particles, said cyclone separator comprising:

a separation chamber in which the particles are separated from the gas;

an inlet configured to provide the mixture of particles and gas to the separation chamber;

a reverse flow gas outlet positioned to receive a portion of the gas, from which particles have been separated, from the separation chamber, the direction of this portion of the gas having been reversed in the separation chamber; and a unidirectional flow gas outlet positioned to receive another portion of the gas, from which particles have been separated, from the separation chamber, the direction of this portion of the gas not having been reversed in the separation chamber.

According to an embodiment, there is provided a cyclone separator, wherein:

the separation chamber has an inlet end;

the inlet and reverse gas outlet are provided at said inlet end; and the unidirectional gas outlet is provided at an end of the separation chamber that is opposite to the inlet end.

According to an embodiment, there is provided a cyclone separator, wherein:

the gas exits the reverse flow gas outlet in a first exit flow direction; and the gas exits the unidirectional flow gas outlet in a second exit flow direction, the first exit flow direction being different to the second exit flow direction.

According to an embodiment, the first exit flow direction is substantially opposite to the second exit flow direction.

According to an embodiment, the separation chamber is arranged to separate the particles from the gas by centrifuging the mixture of gas and particles.

According to an embodiment, the cyclone separator further comprises a solids outlet configured to allow particles, which have been separated from the gas, to exit from the separation chamber.

According to an embodiment, the solids outlet is substantially aligned with the second gas outlet.

According to an embodiment, the solids outlet is provided at the end of the separation chamber that is opposite to the inlet end.

According to an embodiment, at least a portion of the separation chamber is radially symmetric about an axial centreline of the separation chamber.

According to an embodiment, the reverse flow gas outlet comprises a pipe having its centreline substantially aligned with the axial centreline of the separation chamber.

According to an embodiment, the unidirectional flow gas outlet comprises a pipe having its centreline substantially aligned with the axial centreline of the separation chamber.

According to an embodiment, at least a portion of the inner wall of the separation chamber is frusto-conical.

According to an embodiment, at least a part of the separation chamber has an axial centreline, and the inlet is either:

substantially parallel to the axial centreline;

substantially perpendicular to the axial centreline; or forms a scroll around the axis centreline.

According to an embodiment, at least a part of the separation chamber has an axial centreline, and the inlet is offset from the axial centreline.

According to an embodiment, the cyclone separator further comprises a second inlet configured to allow the mixture of particles and gas into the separation chamber.

According to an embodiment, at least a part of the separation chamber has an axial centreline and the second inlet is either:

substantially parallel to the axial centreline;

substantially perpendicular to the axial centreline; or forms a scroll around the axis centreline.

According to an embodiment, the cross sectional area of the reverse flow gas outlet is in the range of from 30% to 50% of the cross sectional area of the inlet, and the cross sectional area of the unidirectional flow gas outlet is in the range of from 30% to 50% of the cross sectional area of the inlet.

According to an aspect, there is provided a method of separating particles from a mixture of gas and particles using a cyclone separator as described herein.

According to an aspect of the invention, there is provided a method of separating particles from a mixture of gas and particles, said method comprising:

providing the mixture to a separation chamber;

reversing the flow direction of a portion of the gas;

allowing another portion of the gas to continue without reversing its flow direction;

removing the portion of gas whose direction has not been reversed via a unidirectional flow gas outlet; and removing the portion of gas whose direction has been reversed via a reverse flow gas outlet.

According to an embodiment the portion of gas removed via the reverse flow gas outlet is removed in a substantially opposite direction to the portion of gas removed via the unidirectional flow gas outlet.

According to an embodiment, the step of separating the mixture comprises centrifugal separation.

According to an embodiment, the method further comprises removing solids separated from the mixture via a solids outlet.

According to an embodiment, there is provided a cyclone separator of a gas-solid suspension, characterised in that it comprises a substantially conical gases and solids separation chamber (1) with:

i. an inlet (11*a*) for letting in the gas-solid suspension in its upper part, ii. an axial outlet (12), in its lower part for removal of the solids separated, iii. a pipe (2) for outlet of a fraction of the gases separated, fastened axially to the upper part of the chamber (1), with an extension into the chamber, being dimensioned for sucking out the fraction of gas with a greater concentration of solids and generating a reverse flow separation zone inside the chamber and iv. a pipe (3) for outlet of a fraction of the gases separated, fastened axially in the lower part of the chamber (1), passing through the inside of the outlet (12) and with an extension into the chamber so as to create an annular space (13) for the removal of solids, being dimensioned for sucking out the fraction of gas containing a lower concentration of unidirectional flow solids and generating a separation zone with unidirectional flow inside the chamber.

The inlet (11*a*) may be tangential.

The inlet (11*a*) may be axial.

The inlet (11*a*) may be in a scroll.

The inlet (11*a*) may be positioned symmetrically with at least one other inlet (11*b*).

The inlet (11*a*) and at least one other inlet (11*b*) may be tangential.

The inlet (11*a*) and at least one other inlet (11*b*) may be axial.

The inlet (11*a*) and at least one other inlet (11*b*) may be in a scroll.

The inlet (11*a*) and at least one other inlet (11*b*) may be a combination of tangential inlets, axial inlets and/or inlets in scrolls.

According to an embodiment, the pipe (2) and pipe (3) may be of a cross sectional area varying between 30% and 50% of the cross sectional area of the inlet (11*a*).

According to an embodiment there is provided a gas-solid separation method using a separator described herein, characterised in that it comprises the following stages:

i. Letting the gas-solid suspension into the chamber (1) by means of the inlet (11*a*), imparting a tangential force component to the suspension so as to separate the suspension, ii. Sucking out the gas separated, in the separation zone with reverse flow by means of the pipe (2) and in the separation zone with unidirectional flow by means of the pipe (3) and iii. Through the annular space (13), removing the separated solid particles which flow away, due to the action of gravity, along the walls of the chamber (1).

In an embodiment of the gas-solid suspension is let into the chamber (1) by means of the inlet (11*a*) and at least one inlet (11*b*) at the same time.

In an embodiment, the inlet (11*a*) is positioned symmetrically with at least one inlet (11*b*).

When the inlet (11*a*) is positioned symmetrically with at least one inlet (11*b*), the separation method consists of letting the gas-solid suspension into the chamber (1) by means of the inlet (11*a*) and at least one inlet (11*b*) at the same time.

BRIEF DESCRIPTION OF THE DRAWINGS

The features of the cyclone separator of a gas-solid suspension and a separation method, which are the object of this invention, will be perceived better from the detailed description, associated with the drawings referenced below, which are an integral part of this specification, but are by way of example only.

DETAILED DESCRIPTION OF THE INVENTION

This invention relates to a cyclone separator for separating a gas-particle (such as gas-solid) suspension and a separation method. The separator may comprise two separation zones in sequence, one with reverse flow, and one unidirectional flow separation zone. In the zone with reverse flow, a portion of the gas of the gas-solid suspension with a high concentration of solids may be separated, and in the unidirectional zone, the other portion of the gas of the suspension, with a low or lower concentration of solids, may be separated.

Figure 1B:
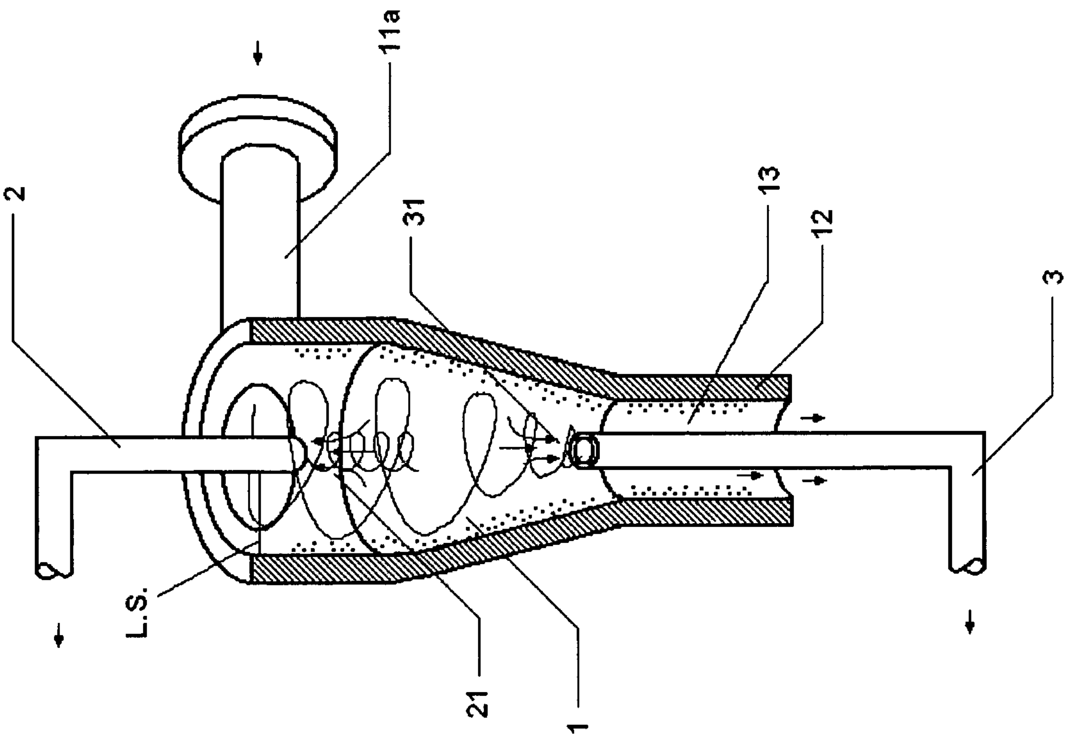
FIG. 1B gives a perspective cutaway representation of the cyclone separator for a gas-solid suspension in a configuration with one inlet.
Figure 1A:
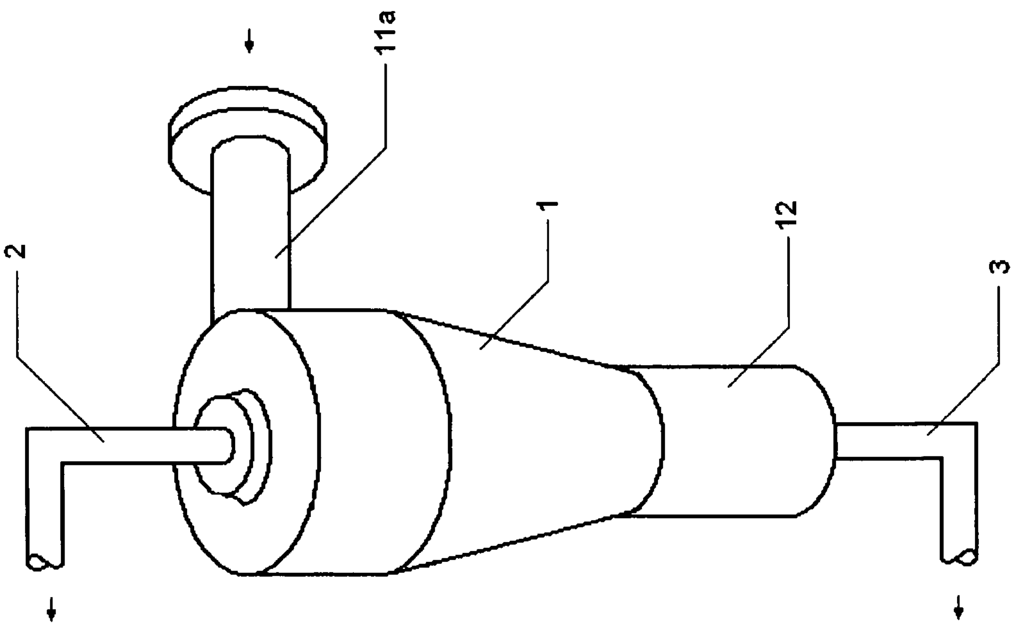
FIG. 1A gives a perspective representation of the cyclone separator for a gas-solid suspension in a configuration with one inlet.

FIG. 1B gives a perspective cutaway representation of a possible embodiment for the cyclone separator, which comprises a substantially conical gas and solid separation chamber (1) with:

- i. an inlet (11*a*) for letting in the gas-solid suspension in its upper part,
- ii. an axial outlet (12), at its lower part for removal of the solids separated,
- iii. a pipe (2) for outlet of a fraction of the gases separated, which may be fastened or provided axially to the upper part of the chamber (1), with an extension into the chamber, being configured (for example by having suitable dimensions) to suck out the fraction of gas with a greater concentration of solids and generating a reverse flow separation zone inside the chamber and
- iv. a pipe (3) for outlet of a fraction of the gases separated, which may be fastened or provided axially in the lower part of the chamber (1), passing through the inside of the outlet (12) and with an extension into the chamber so as to create an annular space (13) for the removal of solids, being configured to (for example by having suitable dimensions) suck out the fraction of gas containing a lower concentration of unidirectional flow solids and generating a separation zone with unidirectional flow inside the chamber.

In any embodiment described herein, the pipe (2) may be referred to as reverse gas flow outlet. The pipe (3) may be referred to as a unidirectional gas flow outlet. The unidirectional flow gas outlet and the reverse flow gas outlet may be spaced apart on the separation chamber (1). For example, the reverse gas flow outlet may be located at an inlet end of the separation chamber (1). The inlet end may be towards the end of the separation chamber where the mixture enters the separation chamber (1). The inlet end may be, for example, the upper 50%, 40%, 30%, 20%, 10%, 5% or less than 5% of the length of the separation chamber (1) in an axial direction of the separation chamber (1). The unidirectional flow gas outlet may be at the opposite end of the separation chamber to the reverse flow gas outlet. The unidirectional flow gas outlet and the reverse flow gas outlet may remove gas from different portions of the separation chamber (1).

Inside the separation chamber (1), the mixture and/or gas may rotate, or swirl, around an axis. The mixture and/or gas may also have a velocity component in an axial direction. This axial direction may be aligned with the axis about which the mixture and/or gas is rotating. The axial direction may additionally or alternatively be aligned with a longitudinal axis and/or rotational axis of symmetry of the separation chamber (1). A portion of the gas/mixture may continue through the separation chamber (1) with an axial velocity component in the same direction throughout. This portion may be removed via the unidirectional flow gas outlet (3). Another portion of the gas/mixture may have its direction reversed as it travels through the separation chamber (1). As such, a portion of the gas/mixture may have its axial velocity component reversed in direction in the separation chamber (1). This portion may be removed via the reverse flow gas outlet (2).

The unidirectional flow gas outlet (3) may extend into the separation chamber (1) such that it is at least partially surrounded by the solids outlet (12). In some embodiments, the solids outlet (12) may not be present.

The inlet (11*a*) of the cyclone separator can be any suitable shape, for example, tangential, axial or in a scroll.

Figure 2A:
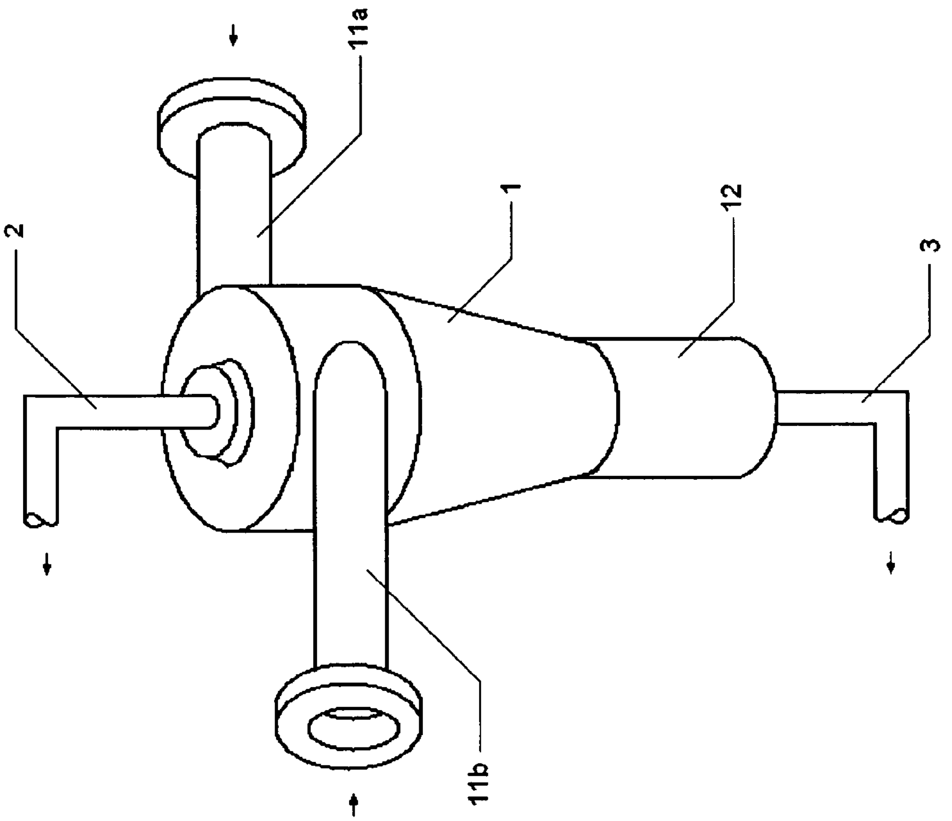
FIG. 2A gives a perspective representation of the cyclone separator for a gas-solid suspension in a configuration with two inlets.
Figure 2B:
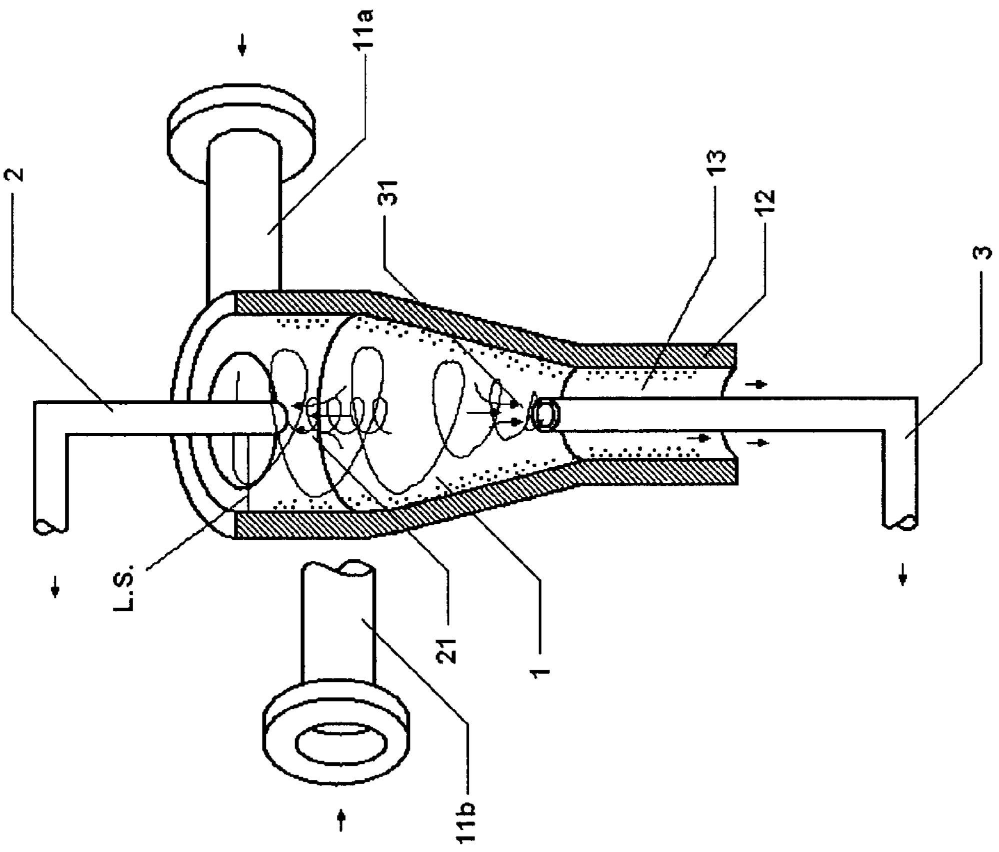
FIG. 2B gives a perspective cutaway representation of the cyclone separator for a gas-solid suspension in a configuration with two inlets.
Figure 3A:
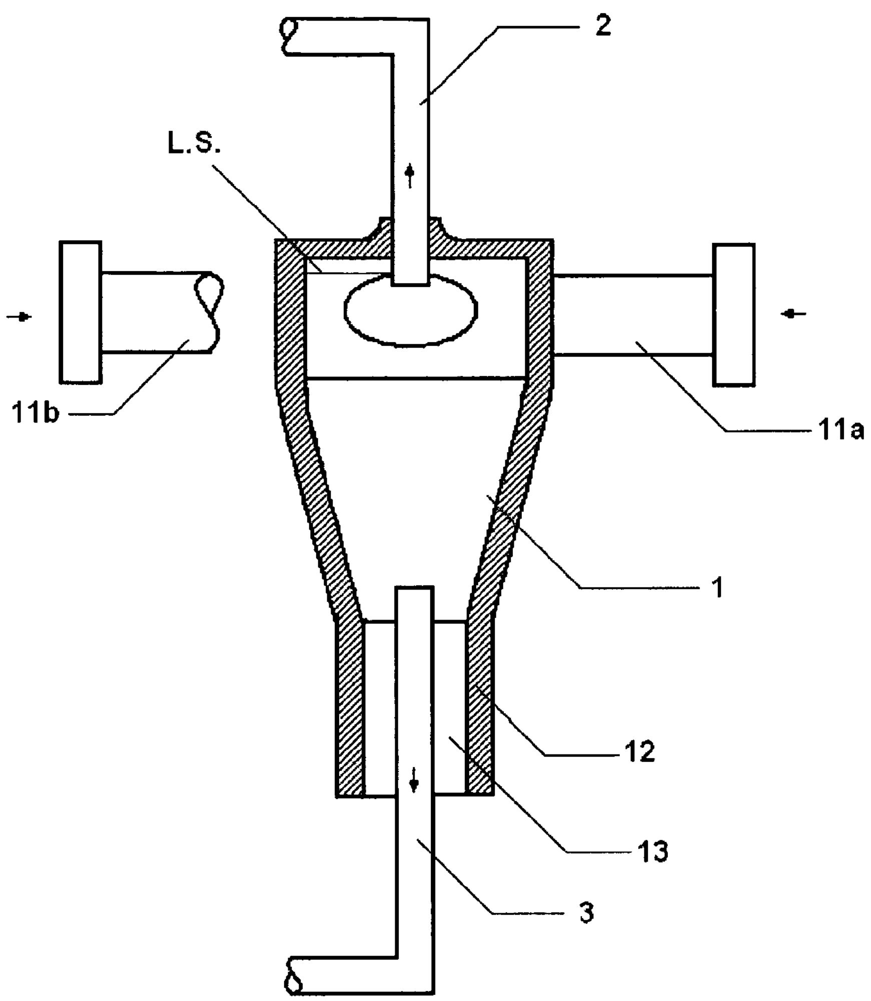
FIG. 3A gives a front view cutaway representation of the cyclone separator for a gas-solid suspension in a configuration with two inlets.
Figure 3B:
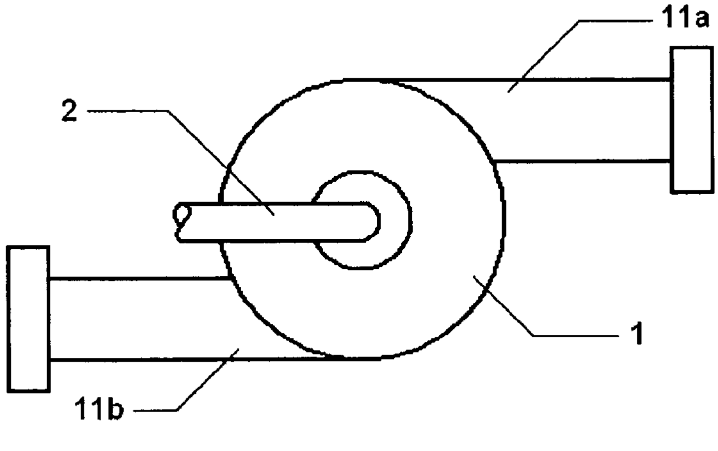
FIG. 3B gives a top view representation of the cyclone separator for a gas-solid suspension in a configuration with two inlets.

FIG. 2B gives a perspective view of an embodiment of cyclone separator, in which the inlet (11*a*) is positioned symmetrically with at least one inlet (11*b*). In this case, the inlet (11*a*) and at least one inlet (11*b*) can be tangential, axial, in scrolls or a combination of tangential inlets, axial inlets and/or inlets in scrolls.

The pipe (2) and/or the pipe (3) may each be of a cross sectional area of, for example, between 20% and 60% of the cross sectional area of the inlet (11*a*). In another embodiment, the pipe (2) and/or the pipe (3) may each be of a cross sectional area of, for example, between 30% and 50% of the cross sectional area of the inlet (11*a*). In another embodiment, the pipe (2) and/or the pipe (3) may each be of a cross sectional area of, for example, 40% of the cross sectional area of the inlet (11*a*). This may be the case for any embodiment described herein. For example, this may be the case for embodiments with one inlet (11*a*), two inlets (11*a*/11*b*), or more than two inlets. This condition may be made viable by the fact that the cyclone separator has two outlet pipes.

With this feature, the length of the separation line (L.S.), which is the distance between the wall of the cyclone chamber (1) and the outlet pipe (2), can be greater, resulting in a greater space being traveled through by the gas in order to reach the outlet pipe (2), which results in greater efficiency of separation or collection of solids.

The separation zone with unidirectional flow substantially reduces the erosion caused by the vortical flow, as it eliminates reversal of the flow in this region.

The method of gas-solid separation using the separator described above comprises the following stages:

i. letting the gas-solid suspension into the chamber (1) by means of the inlet (11*a*), imparting a tangential force component to the suspension so as to separate the suspension;

ii. sucking out the gas separated, in the separation zone with reverse flow by means of the pipe (2) and in the separation zone with unidirectional flow by means of the pipe (3); and iii. through the annular space (13), removing the separated solid particles which flow away, due to the action of gravity, along the walls of the chamber (1).

When the inlet (11*a*) is positioned symmetrically with at least one other inlet (11*b*), the separation method may comprise letting the gas-solid suspension into the chamber (1) by means of the inlet (11*a*) and at least one other inlet (11*b*) at the same time.

Sucking out of a portion of the gas through each outlet pipe preserves the tangential force component, which is the component that carries out the separation of the solid particles, in greater values along the cyclone separator. This enables greater separation efficiency.

The reversal of the vortical flow takes place in the central region of the separator, which is far from the walls. This reduces the entrainment, by the gas, of the solid particles that have already been separated.

This configuration has at least the following advantages with respect to the separators in the prior art:

i. substantial reduction of the erosion in the lower region of the separator, caused by the vortical flow; and/or ii. maintenance of the separation efficiency throughout the length of the path taken by the gas-solid suspension; and/or iii. reduction of the entrainment, by the gas, of solid material already separated.

The description which has so far been given of the cyclone separator of a gas-solid suspension and separation method, which are the object of this invention, must be considered only as one possible embodiment and any particular features will be understood to be by way of example only, in order to assist understanding. This being the case, they cannot be considered to limit the invention.

It will be understood that the present invention can be applied to the separation of a mixture of gas and any particles. The particles may be solid and/or liquid. Where reference has been made herein to the separation of a mixture of gas and solid and/or to an apparatus therefor, this may equally mean the separation of a mixture of gas and particles and/or an apparatus therefor the particles being, for example, solid, liquid or a mixture of both.

The invention claimed is:

1. A cyclone separator for separating particles from a mixture of gas and particles, said cyclone separator comprising:

a separation chamber in which the particles are separated from the gas;

an inlet configured to provide the mixture of particles and gas to the separation chamber;

a reverse flow gas outlet positioned to receive a portion of the gas, from which particles have been separated, from the separation chamber, the direction of this portion of the gas having been reversed in the separation chamber wherein the reverse gas outlet extends into the separation chamber; and a unidirectional flow gas outlet positioned to receive another portion of the gas, from which particles have been separated, from the separation chamber, the direction of this portion of the gas not having been reversed in the separation chamber wherein the unidirectional flow gas outlet extends into the separation chamber.

2. A cyclone separator according to claim 1, wherein:

the separation chamber has an inlet end;

the inlet and reverse flow gas outlet are provided at said inlet end; and the unidirectional gas outlet is provided at an end of the separation chamber that is opposite to the inlet end.

3. A cyclone separator according to claim 1, wherein:

the gas exits the reverse flow gas outlet in a first exit flow direction; and the gas exits the unidirectional flow gas outlet in a second exit flow direction, the first exit flow direction being different to the second exit flow direction.

4. A cyclone separator according to claim 3, wherein the first exit flow direction is substantially opposite to the second exit flow direction.

5. A cyclone separator according to claim 1, further comprising a solids outlet configured to allow particles, which have been separated from the gas, to exit from the separation chamber, the solids outlet optionally being aligned with the second gas outlet.

6. A cyclone separator according to claim 1, wherein at least a portion of the separation chamber is radially symmetric about an axial centreline of the separation chamber.

7. A cyclone separator according to claim 6, wherein the reverse flow gas outlet comprises a pipe having its centreline substantially aligned with the axial centreline of the separation chamber.

8. A cyclone separator according to claim 6, wherein the unidirectional flow gas outlet comprises a pipe having its centreline substantially aligned with the axial centreline of the separation chamber.

9. A cyclone separator according to claim 1, wherein at least a portion of the inner wall of the separation chamber is frustoconical.

10. A cyclone separator according to claim 1, wherein at least a part of the separation chamber has an axial centreline, and the inlet is either:

substantially parallel to the axial centreline;

substantially perpendicular to the axial centreline; or forms a scroll around the axis centreline.

11. A cyclone separator according to claim 1, wherein at least a part of the separation chamber has an axial centreline, and the inlet is offset from the axial centreline.

12. A cyclone separator according to claim 1, further comprising a second inlet configured to allow the mixture of particles and gas into the separation chamber.

13. A cyclone separator according to claim 12, wherein at least a part of the separation chamber has an axial centreline and the second inlet is either:

substantially parallel to the axial centreline;

substantially perpendicular to the axial centreline; or forms a scroll around the axis centreline.

14. A cyclone separator according to claim 1, wherein the cross sectional area of the reverse flow gas outlet is in the range of from 30% to 50% of the cross sectional area of the inlet, and the cross sectional area of the unidirectional flow gas outlet is in the range of from 30% to 50% of the cross sectional area of the inlet.

15. A method of separating particles from a mixture of gas and particles, said method comprising:

providing the mixture to a separation chamber;

reversing the flow direction of a portion of the gas;

allowing another portion of the gas to continue without reversing its flow direction;

removing the portion of gas whose direction has not been reversed via a unidirectional flow gas outlet, wherein the unidirectional flow gas outlet extends into the separation chamber; and removing the portion of gas whose direction has been reversed via a reverse flow gas outlet, wherein the reverse flow as outlet extends into the separation chamber.

16. A method of separating particles from a mixture of gas and particles according to claim 15, wherein the portion of gas removed via the reverse flow gas outlet is removed in a substantially opposite direction to the portion of gas removed via the unidirectional flow gas outlet.

17. A method of separating particles from a mixture of gas and particles according to claim 15, wherein the step of separating the mixture comprises centrifugal separation.

18. A method of separating particles from a mixture of gas and particles according to claim 15, further comprising removing solids separated from the mixture.

* * * * *